US011008095B2

(12) United States Patent
Wang

(10) Patent No.: US 11,008,095 B2
(45) Date of Patent: May 18, 2021

(54) FOLDABLE ROTOR BLADE ASSEMBLY AND AERIAL VEHICLE WITH A FOLDABLE ROTOR BLADE ASSEMBLY

(71) Applicant: Hangzhou Zero Zero Technology Co., Ltd., Zhejiang (CN)

(72) Inventor: Zhaozhe Wang, Zhejiang (CN)

(73) Assignee: Hangzhou Zero Zero Technology Co., Ltd., HangZhou (CN)

( * ) Notice: Subject to any disclaimer, the term of this patent is extended or adjusted under 35 U.S.C. 154(b) by 133 days.

(21) Appl. No.: 16/243,593

(22) Filed: Jan. 9, 2019

(65) Prior Publication Data

US 2019/0210718 A1  Jul. 11, 2019

Related U.S. Application Data

(60) Provisional application No. 62/615,752, filed on Jan. 10, 2018.

(51) Int. Cl.
  *B64C 27/39* (2006.01)
  *B64C 27/72* (2006.01)
  *B64C 27/48* (2006.01)
(52) U.S. Cl.
  CPC ............. *B64C 27/39* (2013.01); *B64C 27/48* (2013.01); *B64C 27/72* (2013.01); *B64C 2027/7211* (2013.01)
(58) Field of Classification Search
  CPC ......... B64C 27/48; B64C 27/50; B64C 11/04; B64C 27/39; B64C 27/72

(Continued)

(56) References Cited

U.S. PATENT DOCUMENTS 3,254,724 A * 6/1966 Brooke .................. B64C 27/50
  416/143
4,156,583 A * 5/1979 Mayerjak ................ B64C 27/39
  416/134 A (Continued)

FOREIGN PATENT DOCUMENTS

| CN | 203727643 U | 7/2014 | |
| CN | 107108028 A | 8/2017 | |
| WO | WO-2017177406 A1 * | 10/2017 | ............. B64C 27/32 |

OTHER PUBLICATIONS

English Translation of WO 2017/177406 A1 (Year: 2017).*

(Continued)

*Primary Examiner* — Eldon T Brockman
*Assistant Examiner* — Michael L Sehn

(57) ABSTRACT

An aerial vehicle is described herein. The aerial vehicle includes a lift mechanism that includes a rotor blade assembly coupled to a motor assembly. The rotor blade assembly includes a plurality of rotor blades that are pivotably coupled to a rotor blade clamping mechanism. The rotor blade clamping mechanism includes an upper paddle clamp that is coupled to a lower paddle clamp. The upper paddle clamp includes a center protrusion and a plurality of blade support protrusions extending outwardly from the lower outer surface. The center protrusion includes a center shaft aperture sized and shaped to receive a motor shaft therein. Each blade support protrusion is sized and shaped to be inserted through a corresponding positioning aperture of a corresponding rotor blade. The lower paddle clamp includes a central recess to receive the center protrusion therein and a plurality of blade recesses to receive a corresponding blade support protrusion therein.

24 Claims, 13 Drawing Sheets

(58) Field of Classification Search
USPC .................................................. 416/142, 143
See application file for complete search history.

(56) References Cited

U.S. PATENT DOCUMENTS

| | | | |
|---|---|---|---|
| 9,359,070 B2 * | 6/2016 | Caubel | B64C 27/48 |
| 2016/0001879 A1 * | 1/2016 | Johannesson | B64C 27/50 |
| | | | 416/142 |
| 2017/0166302 A1 | 7/2017 | Shiosaki | |
| 2017/0283050 A1 * | 10/2017 | Baek | B64C 39/024 |

OTHER PUBLICATIONS

International Search Report (International Application No. PCT/IB2019/050170); dated Apr. 28, 2019; 9 pages.
International Preliminary Report on Patentability (International Application No. PCT/IB2019/050170); dated Jul. 23, 2020; 5 pages.

* cited by examiner

FOLDABLE ROTOR BLADE ASSEMBLY AND AERIAL VEHICLE WITH A FOLDABLE ROTOR BLADE ASSEMBLY

CROSS-REFERENCE TO RELATED APPLICATIONS

This application claims the benefit of U.S. Provisional Patent Application Ser. No. 62/615,752, filed on Jan. 10, 2018, which is hereby incorporated by reference in its entirety for all purposes.

TECHNICAL FIELD

This invention relates generally to unmanned aerial vehicles, and more specifically, to a rotor blade assembly having foldable rotor blades.

BACKGROUND OF THE INVENTION

The propeller of traditional flying vehicles, e.g., drones, typically has either a complex structure or a simple structure. Particularly in drone aircraft, it may be advantageous to have a propeller structure that fulfills its primary function of maintaining the propeller blades in place during operation, while allowing the blades to be moved into a suitable position for transport. Ideally, the blade position for transport minimizes the overall size of the aircraft while minimizing the risk of damage to the propeller blades.

Generally, prior art propeller structures are simple which does not allow the blades to be moved into an arrangement suitable for transport or are too complex with a relatively large number of parts which increases the cost of the aircraft.

The present invention is aimed at one or more of the problems identified above.

SUMMARY OF THE INVENTION

In one embodiment of the present invention, an unmanned aerial vehicle is provided. The unmanned aerial vehicle includes a fuselage body and a lift mechanism coupled to the fuselage body. The lift mechanism includes a motor assembly and a rotor blade assembly coupled to the motor assembly. The motor assembly includes a rotor and a stator operatively coupled to the rotor for rotating the rotor about a rotor centerline axis. The rotor includes a blade assembly support member and a motor shaft extending outwardly from the blade assembly support member along the rotor centerline axis. The rotor blade assembly is coupled to the rotor. The rotor blade assembly includes a plurality of rotor blades that are pivotably coupled to a rotor blade clamping mechanism. Each rotor blade extending between a root portion and a tip portion. The root portion includes a positioning aperture that extends through the root portion. The rotor blade clamping mechanism includes an upper paddle clamp that is coupled to a lower paddle clamp. The upper paddle clamp includes an upper support body and a plurality of blade support protrusions. The upper support body includes an upper outer surface and a lower outer surface. The plurality of blade support protrusions extend outwardly from the lower outer surface. Each of the blade support protrusions is configured to be inserted through a corresponding positioning aperture of a corresponding rotor blade to facilitate pivotably coupling the corresponding rotor blade to the upper paddle clamp. Each blade support protrusion has a length that is greater than a thickness of the root portion of the corresponding rotor blade. Each blade support protrusion includes a blade fastener positioning aperture configured to receive a blade fastener. The lower paddle clamp includes a lower support body and a plurality of apertures defined along an outer surface of the lower support body. Each aperture in the outer surface of the lower support body is aligned with a respective blade fastener positioning aperture for receiving the respective blade fastener. The upper and lower support bodies form a gap configured to receive the root portion of a respective rotor blade. The gap has a predefined distance. The upper and lower paddle clamps forming a center shaft aperture configured to receive the motor shaft therethrough.

In another embodiment of the present invention, a rotor blade assembly for use with unmanned aerial vehicle is provided. The unmanned aerial vehicle includes a fuselage body and a lift mechanism coupled to the fuselage body. The lift mechanism includes a motor assembly including a motor shaft. The rotor blade assembly includes a plurality of rotor blades pivotably coupled to a rotor blade clamping mechanism. Each rotor blade extends between a root portion and a tip portion. The root portion includes a positioning aperture extending through the root portion. The rotor blade clamping mechanism includes an upper paddle clamp coupled to a lower paddle clamp. The upper paddle clamp includes an upper support body and a plurality of blade support protrusions. The upper support body includes an upper outer surface and a lower outer surface. The plurality of blade support protrusions extend outwardly from the lower outer surface. Each of the blade support protrusions is configured to be inserted through a corresponding positioning aperture of a corresponding rotor blade to facilitate pivotably coupling the corresponding rotor blade to the upper paddle clamp. Each blade support protrusion has a length that is greater than a thickness of the root portion of the corresponding rotor blade. Each blade support protrusion includes a blade fastener positioning aperture configured to receive a blade fastener. The lower paddle clamp includes a lower support body and a plurality of apertures defined along an outer surface of the lower support body. Each aperture in the outer surface of the lower support body is aligned with a respective blade fastener positioning aperture for receiving the respective blade fastener. The upper and lower support bodies form a gap configured to receive the root portion of a respective rotor blade. The gap has a predefined distance. The upper and lower paddle clamps forming a center shaft aperture configured to receive the motor shaft therethrough.

DETAILED DESCRIPTION OF THE INVENTION

Figure 1:
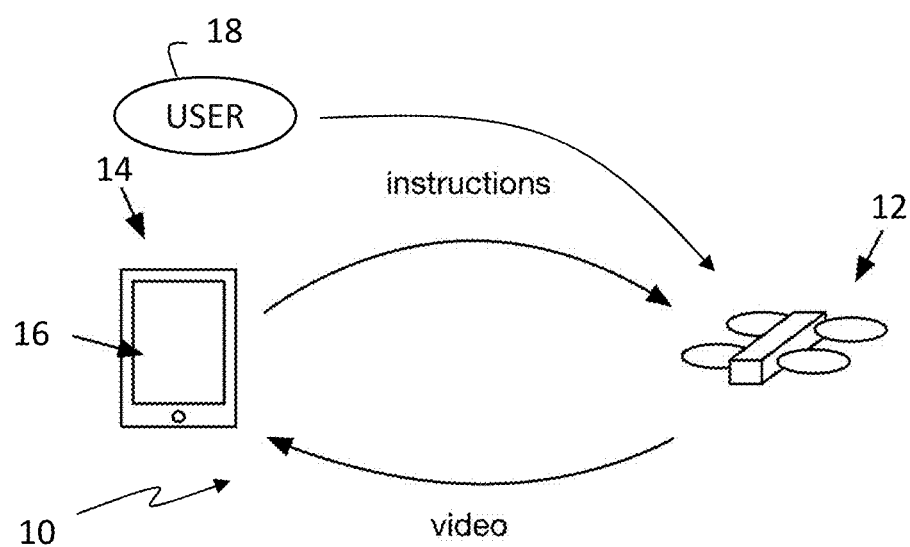
FIG. 1 is a schematic representation of an aerial system for controlling an unmanned aerial vehicle, according to an embodiment of the present invention.

An autonomous aerial system is described and illustrated herein. In one embodiment, the aerial system is a so-called "hopter" unmanned aerial vehicle or drone. The aerial system may be activated by a user, released, and may then hover in the air. While hovering, the aerial system may automatically take pictures and videos for the user with minimum interaction or remote control from the user. After the aerial system has completed taking pictures or videos, the aerial system may perform a controlled landing.

In general, the present invention is directed to an unmanned aerial vehicle that includes a rotor blade assembly including foldable rotor blades or propellers. The aerial vehicle includes a body, a foldable propeller coupled to the body, and a motor coupled to the propeller. The foldable propeller includes clamping mechanism formed by upper and lower paddle clamps. The upper paddle clamp includes a cylindrical protrusion that fits within an aperture in a respective propeller blade. Respective fasteners clamp or hold the upper and lower paddle clamps together. The cylindrical protrusions define a gap having an associated distance between the upper and lower paddle clamps. The gap provides a desired friction between a surface of the clamps and the propeller, i.e., a desired tightness, which is independent of the torque applied to the fasteners.

In one embodiment, the aerial vehicle includes a foldable propeller assembly having two or more propeller rotor blades. The propeller blades may be folded or rotated backwards against the body of the aerial system in a stowed position to enable the aerial system to be conveniently stored, handled, and transported. The propeller blades may be moved back into an extended position when the user is ready to operate the aerial system.

The following description of the embodiments of the invention is not intended to limit the invention to these embodiments, but rather to enable any person skilled in the art to make and use this invention. With reference to the drawings and in operation, a system 10 for controlling an aerial vehicle 12, for example a drone or other unmanned aerial vehicle, is provided. The system 10 may include a remote device 14 with a control client 16. The control client 16 provides a user interface that allows a user 18 to send instructions to the aerial vehicle 12 to control operation thereof. As discussed in more depth below, the aerial vehicle 12 includes one or more cameras for obtaining pictures and/or video which may be sent to the remote device 14 and/or stored in memory on the aerial vehicle 12.

Overview of the System 10 and the Aerial Vehicle 12

Figure 2:
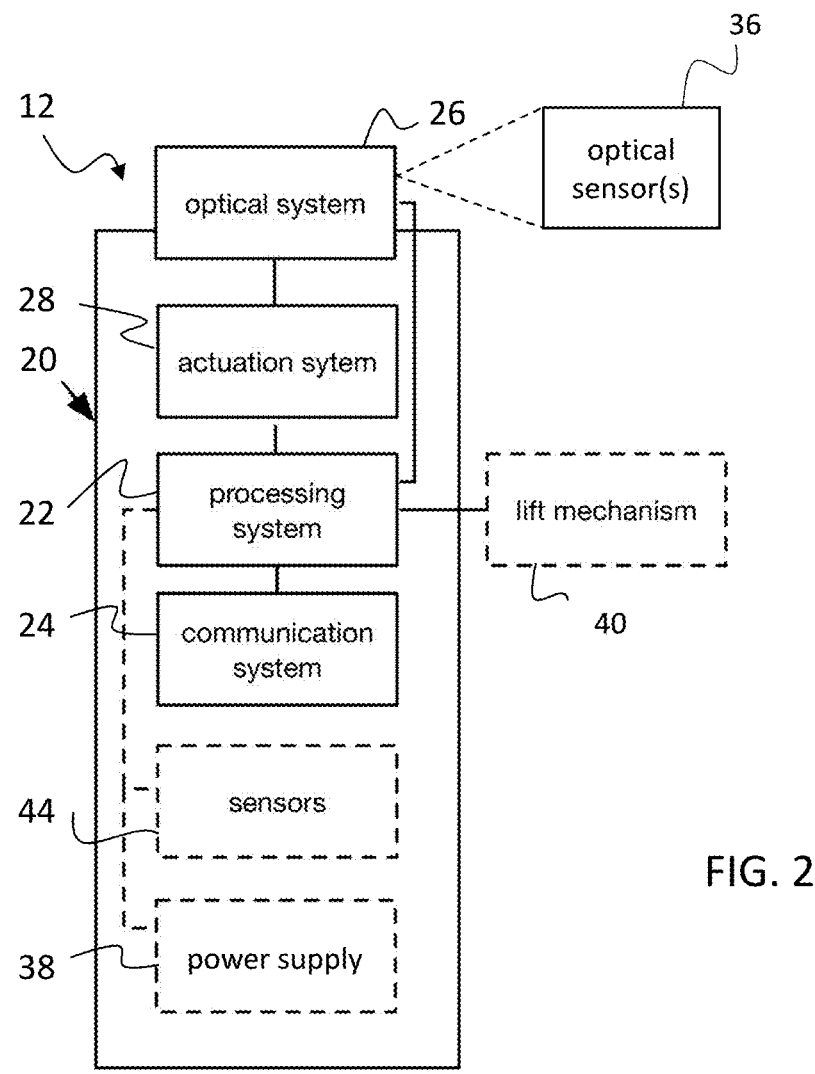
FIGS. 2-3 are views of an unmanned aerial vehicle that may be used with the aerial system show in FIG. 1, according to an embodiment of the present invention.
Figure 3:
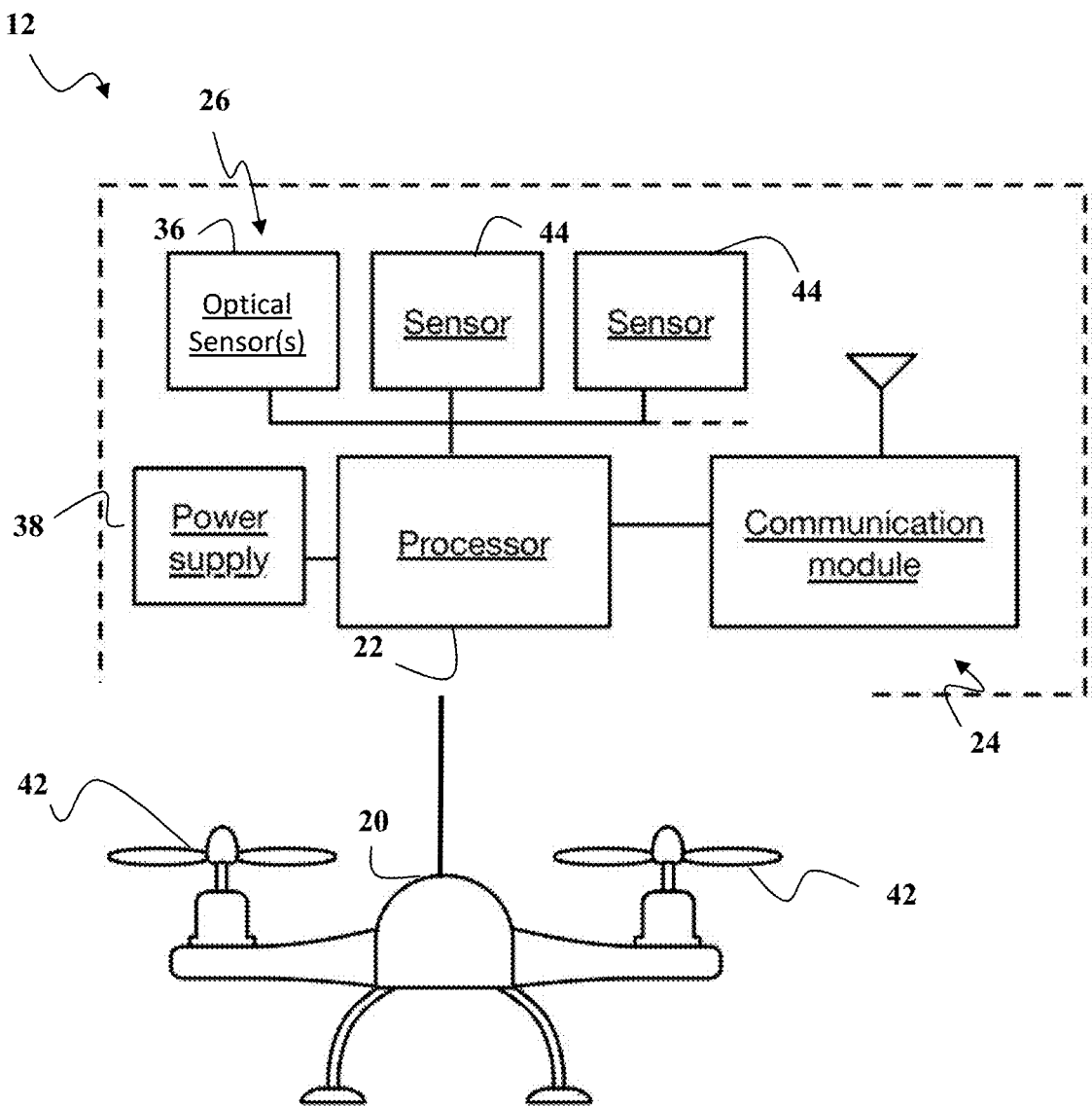

An exemplary aerial vehicle 12 and control system 10 is shown in FIGS. 1-3. The control client 16 of the aerial vehicle 12 functions to receive data from the aerial vehicle 12, including video images and/or video, and control visual display on the remote device 14. The control client 16 may also receive operation instructions and facilitate aerial vehicle 12 remote control based on operation instructions. The control client 16 is preferably configured to execute on a remote device 14, but can alternatively be configured to execute on the aerial vehicle 12 or on any other suitable system. As discussed above, and more fully below, the aerial vehicle 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial vehicle 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial vehicle 12 functions to fly within a physical space, capture video, stream the video in near-real time to the remote device 14, and operate based on operation instructions received from the remote device 14.

The aerial vehicle 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial vehicle 12 can additionally function to move the optical sensor's field of view within the physical space. For example, the aerial vehicle 12 can control macro movements (e.g., large FOV changes, on the order of meter adjustments), micro movements (e.g., small FOV changes, on the order of millimeter or centimeter adjustments), or any other suitable movement.

The aerial vehicle 12 can perform certain functionality based on onboard processing of sensor data from onboard sensors. This functionality may include, but is not limited to:
Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

In the illustrated embodiment, the aerial vehicle 12 includes a fuselage body 20, a processing system 22, a communication system 24, an optical system 26, and an actuation mechanism 28 mounting the optical system 26 to the body 20. The aerial vehicle 12 can additionally or alternatively include one or more optical sensors 36, power supply 38, lift mechanisms 40, additional sensors 44, or any other suitable component (see below).

The body 20 of the aerial vehicle 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The body 20 preferably substantially encapsulates the communication system 24, power supply 38, and processing system 22, but can be otherwise configured. The body 20 can include a platform, a housing, or have any other suitable configuration. In one variation, the body 20 includes a main body housing the communication system 24, power supply 38, and processing system 22.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial vehicle 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial vehicle 12 functions to control aerial system operation. The processing system 22 can: stabilize the aerial vehicle 12 during flight (e.g., in an embodiment in which coaxial rotors are used, control the rotors to minimize aerial system wobble in-flight); receive, interpret, and operate the aerial vehicle 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial vehicle 12 and mounted to the body 20, but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial vehicle 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial vehicle 12 functions to send and/or receive information from the remote device 14. The communication system 24 is preferably connected to the processing system 22, such that the communication system 24 sends and/or receives data form the processing system 22, but can alternatively be connected to any other suitable component. The aerial vehicle 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial vehicle 12 functions to record images of the physical space proximal the aerial vehicle 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the bottom end of the body 20, but can optionally be mounted to the front, top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial vehicle 12 can include one or more optical systems 26 of same or different type, mounted to the same or different position. In one variation, the aerial vehicle 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

The optical system 26 can include one or more optical sensors 36. The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial vehicle 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power source or supply 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial vehicle 12 functions to power the active components of the aerial vehicle 12. The power supply 38 is preferably mounted to the body 20, and electrically connected to all active components of the aerial vehicle 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial vehicle 12 functions to enable aerial system flight. The lift mechanism 40 preferably includes a set propeller rotor blades 42 driven by one or more motors, but can alternatively include any other suitable propulsion mechanism. The lift mechanism 40 is preferably mounted to the body 20 and controlled by the processing system 22, but can alternatively be otherwise mounted to the aerial vehicle 12 and/or controlled. The aerial vehicle 12 can include multiple lift mechanisms 40. In one example, the aerial vehicle 12 includes four lift mechanisms 40 (e.g., two pairs of lift mechanisms 40), wherein the lift mechanisms 40 are substantially evenly distributed about the perimeter of the aerial vehicle 12 (e.g., wherein the lift mechanisms 40 of each pair oppose each other across the body 20). However, the lift mechanisms 40 can be otherwise configured.

Additional sensors 44 of the aerial system function to record signals indicative of aerial system operation, the ambient environment surrounding the aerial vehicle 12 (e.g., the physical space proximal the aerial vehicle 12), or any other suitable parameter. The sensors 44 are preferably mounted to the body 20 and controlled by the processing system 22, but can alternatively be mounted to any other suitable component and/or otherwise controlled. The aerial vehicle 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial vehicle 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial vehicle 12 can additionally include inputs (e.g., microphones, cameras, etc.), outputs (e.g., displays, speakers, light emitting elements, etc.), or any other suitable component.

The aerial vehicle 12 can optionally be used with a remote computing system, or with any other suitable system. The aerial vehicle 12 functions to fly, and can additionally function to take photographs, deliver loads, and/or relay wireless communications. The aerial vehicle 12 is preferably a rotorcraft (e.g., hopter, quadcopter, helicopter, cyclocopter, etc.), but can alternatively be a fixed-wing aircraft, aerostat, or be any other suitable aerial vehicle 12.

The remote computing system may be a remote device 14 that functions to receive auxiliary user inputs, and can additionally function to automatically generate control instructions for and send the control instructions to one or more aerial systems 12. Each aerial vehicle 12 can be controlled by one or more remote computing systems (e.g., one or more remote devices 14). The remote computing system preferably controls the aerial vehicle 12 through a client (e.g., a native application, browser application, etc.), but can otherwise control the aerial vehicle 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. In some embodiments, control of the aerial vehicle 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial vehicle 12.

In at least one embodiment, the aerial vehicle 12 may be controlled without physical interaction with the remote device 14, however, a display of the remote device 14 may be used to display images and/or video relayed from the aerial vehicle 12 which may aid the user 18 in controlling the aerial vehicle 12. In addition, sensors 36, 44 associated with the remote device 14, e.g., camera(s) and/or a microphone (not show) may relay data to the aerial vehicle 12, e.g., when the aerial vehicle 12 is too far away from the user 18. The sensor data relayed from the remote device 14 to the aerial vehicle 12 is used in the same manner as the sensor data from the on-board sensors 36, 44 are used to control the aerial vehicle 12 using user expression.

In this manner, the aerial vehicle 12 may be fully controlled, from start to finish, either (1) without utilization of a remote device 14, or (2) without physical interaction with the remote device 14. Control of the aerial vehicle 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial vehicle 12 during flight and other features, such as triggering of photo and/or video capturing. As discussed above, the aerial vehicle 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial vehicle 12 includes an optical system 26 that includes one or more optical sensor 36, such as a camera. The at least one on-board camera is configured for live video streaming and computer vision analysis. Optionally the aerial vehicle 12 can have at least one depth sensor (or stereo-vision pair) for multi-pixel depth sensing. Optionally the aerial vehicle 12 can have at least one microphone on board for voice recognition and control.

In general, in order to provide full control of the aerial vehicle 12, a plurality of user/drone interactions or activities from start to end of an aerial session are provided. The user/drone interactions, include, but are not limited to take-off and landing, owner recognition gesture recognition, facial expression recognition, and voice control.

Foldable Propeller Assembly

With reference to FIGS. 4-14, in the illustrated embodiment, the lift mechanism 40 includes a propeller structure including a rotor blade assembly 50 that is coupled to a rotary driving member 54. The rotor blade assembly 50 includes a rotor blade clamping mechanism 52 and a plurality of rotor blades 56 that are pivotably coupled to the rotor blade clamping mechanism 52. In the illustrated embodiments, the rotor blade clamping mechanism 52 defines a predetermined distance between upper and lower clamping surfaces. The upper and lower clamping surfaces are engaged with corresponding surfaces of a respective propeller rotor blade. The distance between the upper and lower clamping surfaces is fixed, thus, the friction between the clamping surfaces and the blade of the propeller can be set and is independent of other factors, e.g., the torque applied to the fasteners used to assemble the rotor blade assembly 50. In the first and second illustrated embodiments, the upper and lower clamping surfaces form a gap having a predefined distance. The distance between the upper and lower clamping surfaces is slightly larger than the thickness 100 of the propeller (see FIG. 9 and below). Thus, the structure of the first and second embodiments provides a constant dimension or space for the propeller. Without this structure, the friction between the clamping mechanism 52 and the propeller varies based on the position, or torque applied to, the fasteners.

The rotor blade assembly 50 includes the rotor blade clamping mechanism 52, a rotary driving member 54, e.g., a motor assembly, and a plurality of propeller rotor blades 56. In the illustrated embodiment, the rotor blade assembly 50 includes two propeller rotor blades 56. However, it should be noted that the rotor blade assembly 50 may include any number of rotor blades 56.

In a first illustrated embodiment shown in FIGS. 4-8, the rotor blade clamping mechanism 52 includes an upper paddle clamp 52A and a lower paddle clamp 52B. The upper paddle clamp 52A includes a plurality of cylindrical protrusions 60: a center cylindrical protrusion 60A and first and second blade protrusions 60B, 60B. The center cylindrical protrusion 60A is received within a central recess 62 in an upper surface of the lower paddle clamp 52B. The positioning of the center cylindrical protrusion 60A within the central recess 62 assists in the proper positioning of the upper paddle clamp 52A relative to the lower paddle clamp 52B. The center cylindrical protrusion 60A and the central recess 62 have respective upper and lower center apertures which form a center aperture 64 for receipt of a rotating motor shaft 66.

In an alternative embodiment, as shown in FIGS. 10-14, a modified upper paddle clamp 52A' and a modified lower paddle clamp 52B' are shown. In the alternative embodiment, the upper paddle clamp 52A' includes the first and second blade protrusions 60B, 60B, but does not include a center cylindrical protrusion 60A. Further, the lower paddle clamp 52B' lacks a central recess 62 (for receiving the center cylindrical protrusion). The upper and lower paddle clamps 52A', 52B' include apertures that jointly form the center aperture 64 for receipt of the rotating motor shaft 66.

The blade protrusions 60B of the upper paddle clamp 52A, 52A' are nested or received in a positioning aperture 68 of the respective blade 56. Blade recesses 70 in the upper surface of the lower paddle clamp 52B, 52B' receive the corresponding first and second blade protrusions 60B of the upper clamp 52A, 52A'. The blade protrusions 60B have center blade fastener positioning apertures 130 for receipt of a respective blade fastener 72. The blade fasteners 72 are further received in respective threaded blade fastener apertures 74 in the lower paddle clamp 52B, 52B'. The upper and lower paddle clamps 52A, 52B, 52A', 52B' and the blade fasteners 72 form the rotor blade clamping mechanism 52 which confines the propeller rotor blades 56 between the upper paddle clamp 52A, 52A' and the lower paddle clamp 52B,52B'. When assembled, the height of the protrusions 60A, 60B define the spacing between the upper paddle clamp 52A, 52A' and the lower paddle clamp 52B, 52B'. This arrangement ensures that mounting of the blades has the correct amount of tightness, and that it is independent of, or less affected by the torque applied to the fasteners during assembly. The radial position accuracy of the rotor blades 56 is ensured by the mating of the protrusions 60B and the respective positioning aperture 68. Fast and convenient positioning and assembly are achieved via mating of the recess 62 and the center cylindrical protrusion 60A.

Figure 4:
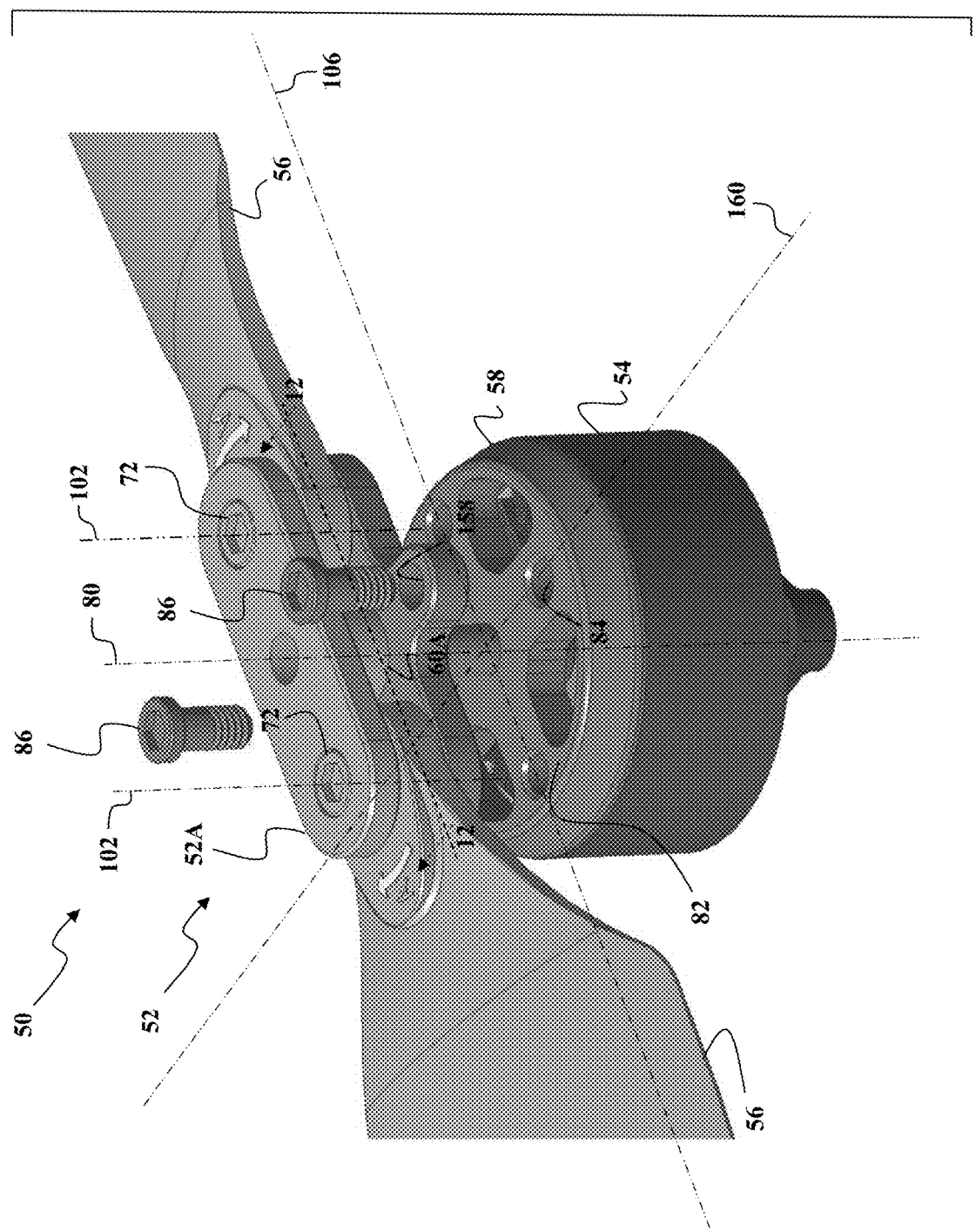
FIG. 4 is perspective view of a lift mechanism including a foldable propeller assembly and rotor blade clamping mechanism for use with unmanned aerial vehicle show in FIGS. 2-3, according to an embodiment of the present invention.
Figure 5:
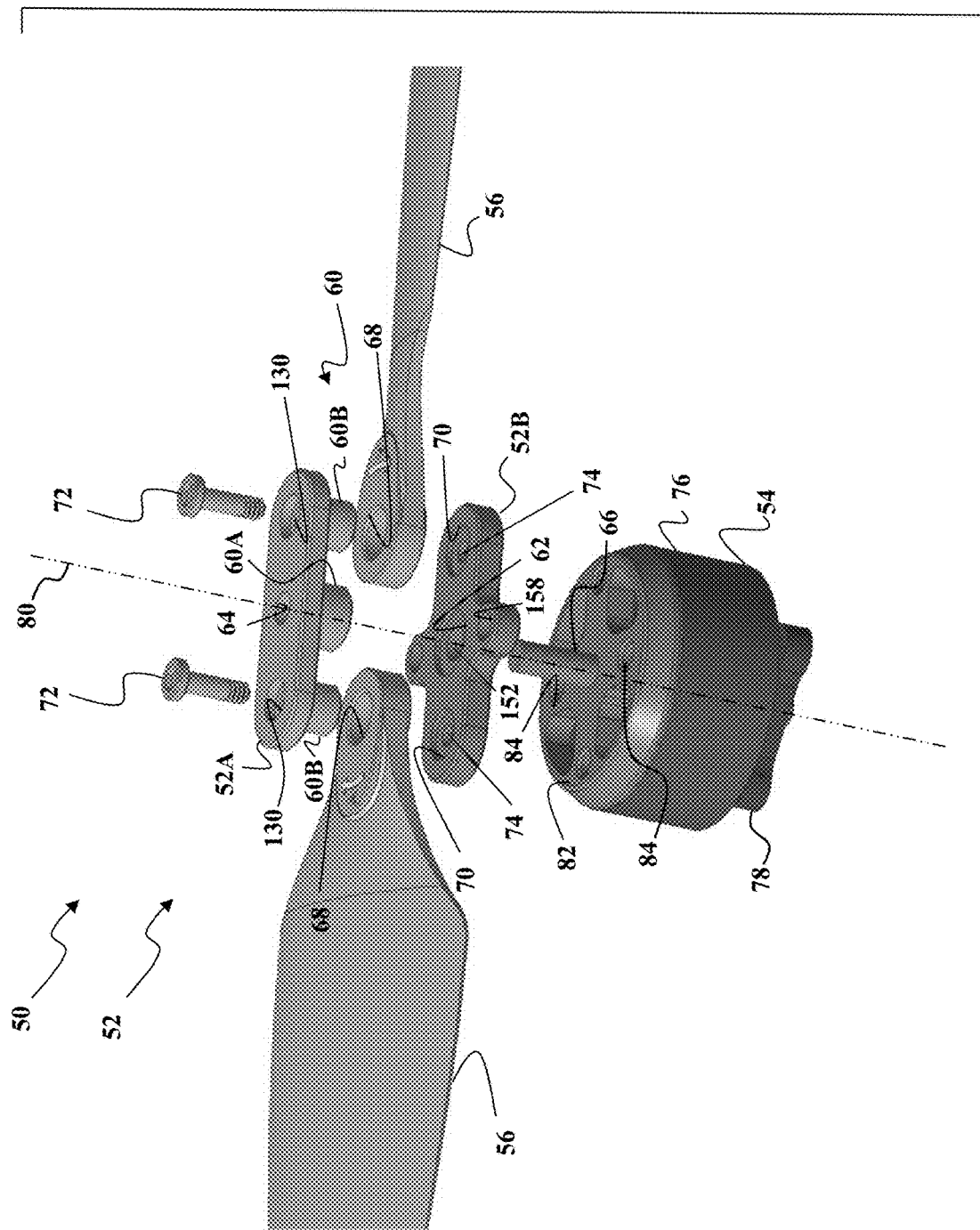
FIG. 5 is an exploded view of the lift mechanism shown in FIG. 4.
Figure 6:
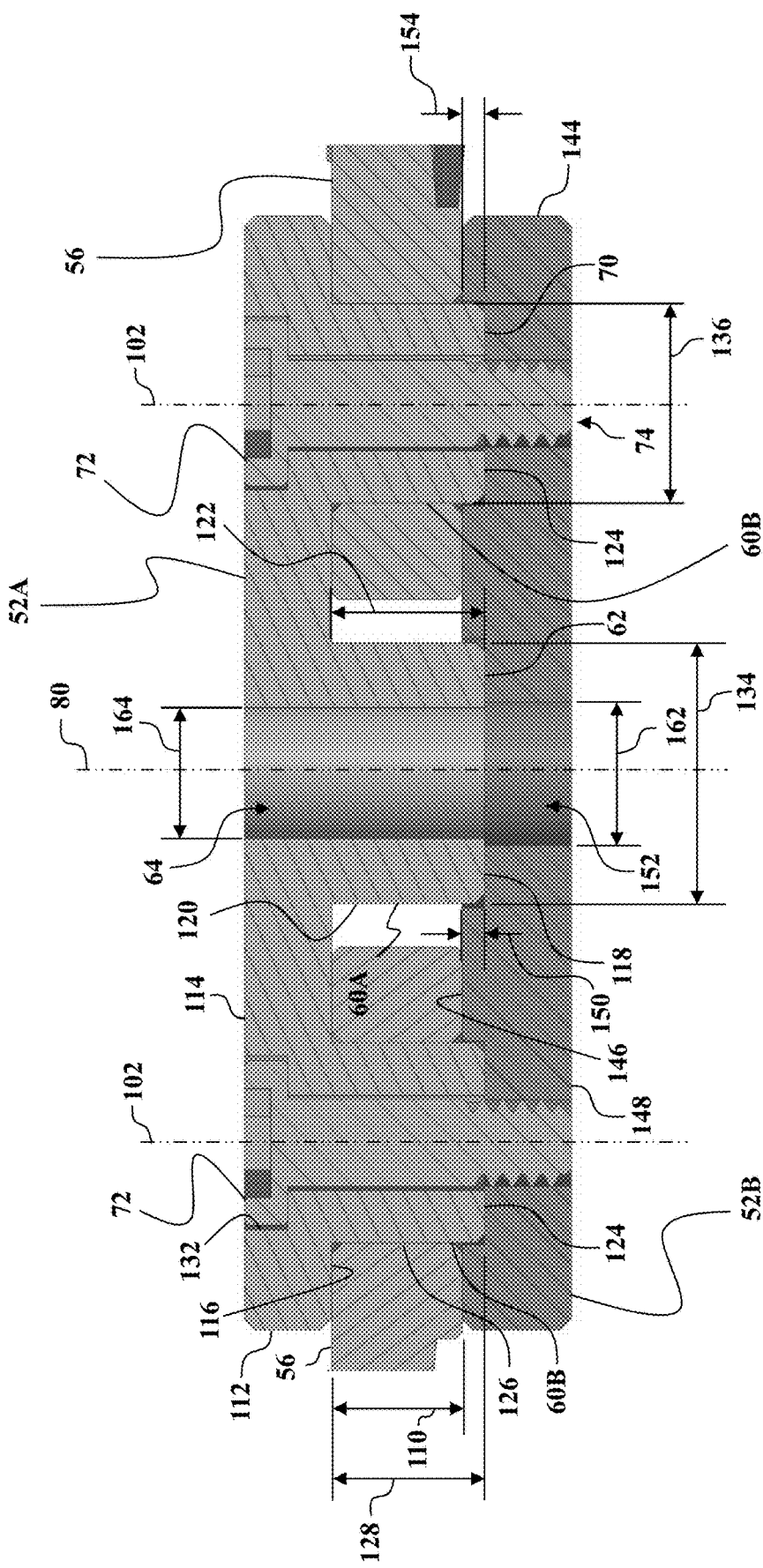
FIG. 6 is a cutaway view of a portion of the lift mechanism show in FIG. 4 taken along line 12-12.
Figure 7:
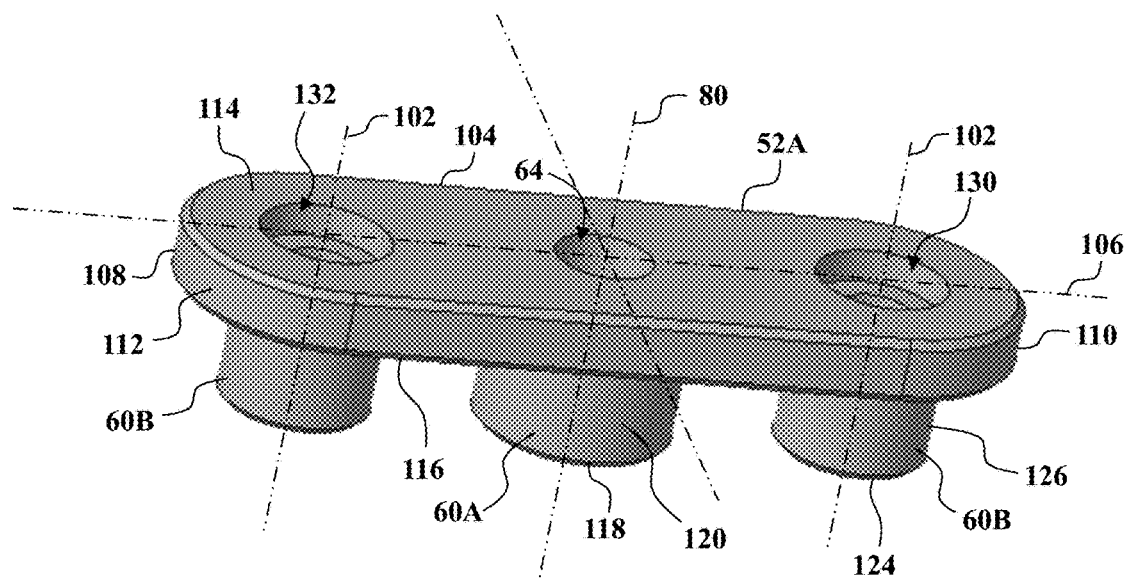
FIG. 7 is a perspective view of an upper paddle clamp of the rotor blade clamping mechanism that may be used with the lift mechanism shown in FIG. 4, according to an embodiment of the present invention.
Figure 8:
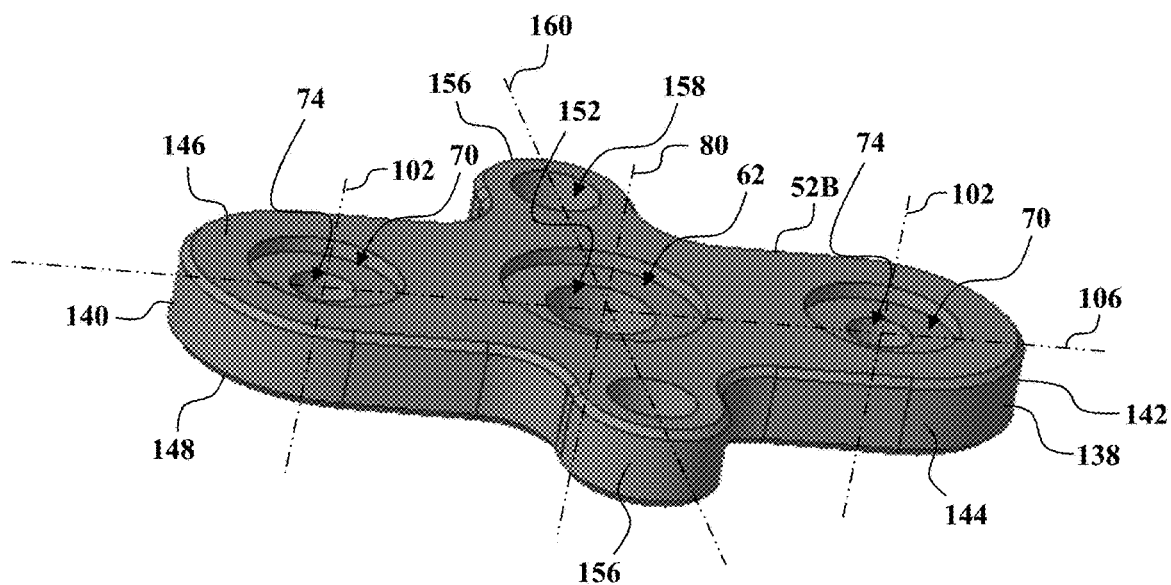
FIG. 8 is a perspective view of a lower paddle clamp of the rotor blade clamping mechanism that may be used with the lift mechanism shown in FIG. 4, according to an embodiment of the present invention.
Figure 9:
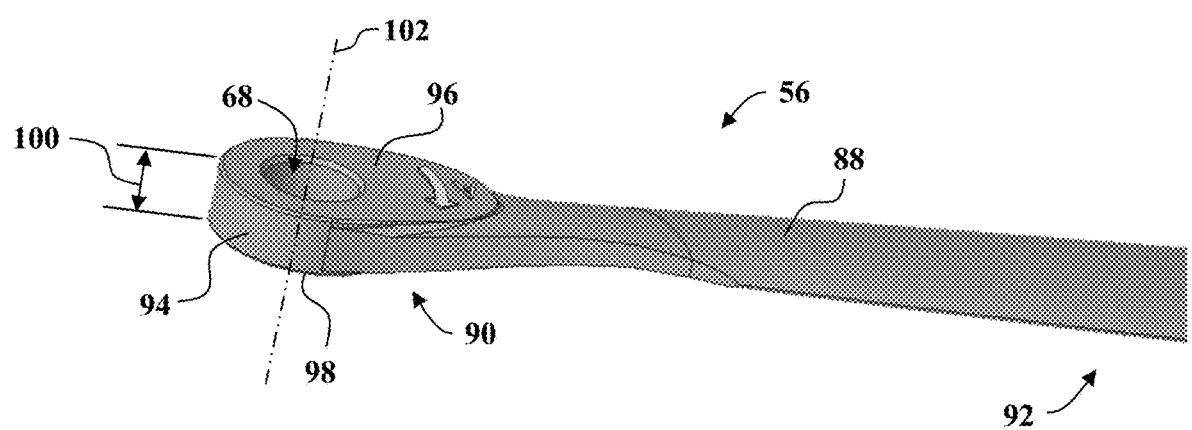
FIG. 9 is a perspective view of a portion of a rotor blade that may be used with the lift mechanism shown in FIG. 4, according to an embodiment of the present invention.
Figure 10:
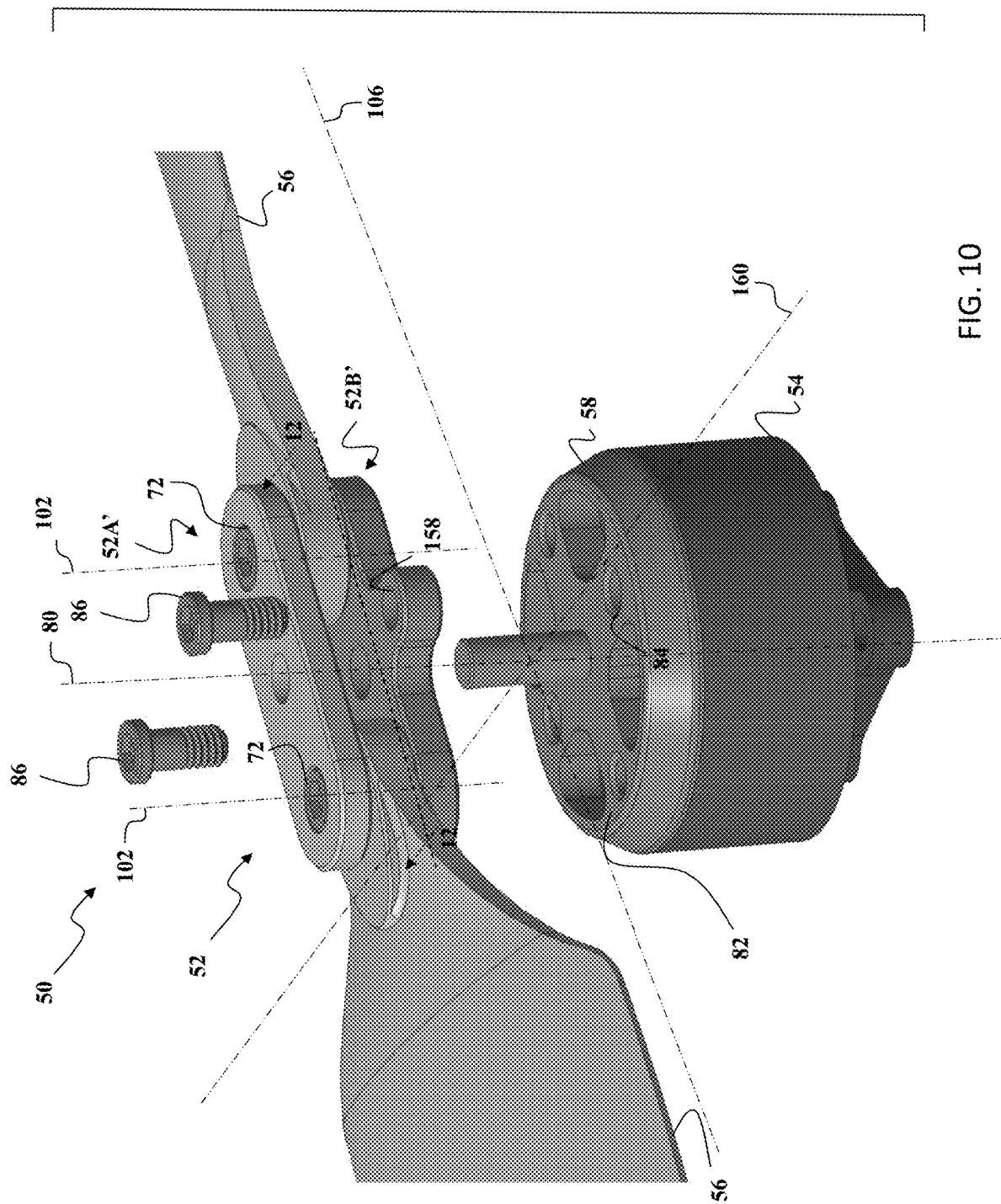
FIGS. 10-14 are perspective views of a portion of a lift mechanism according to an alternative embodiment of the present invention.
Figure 11:
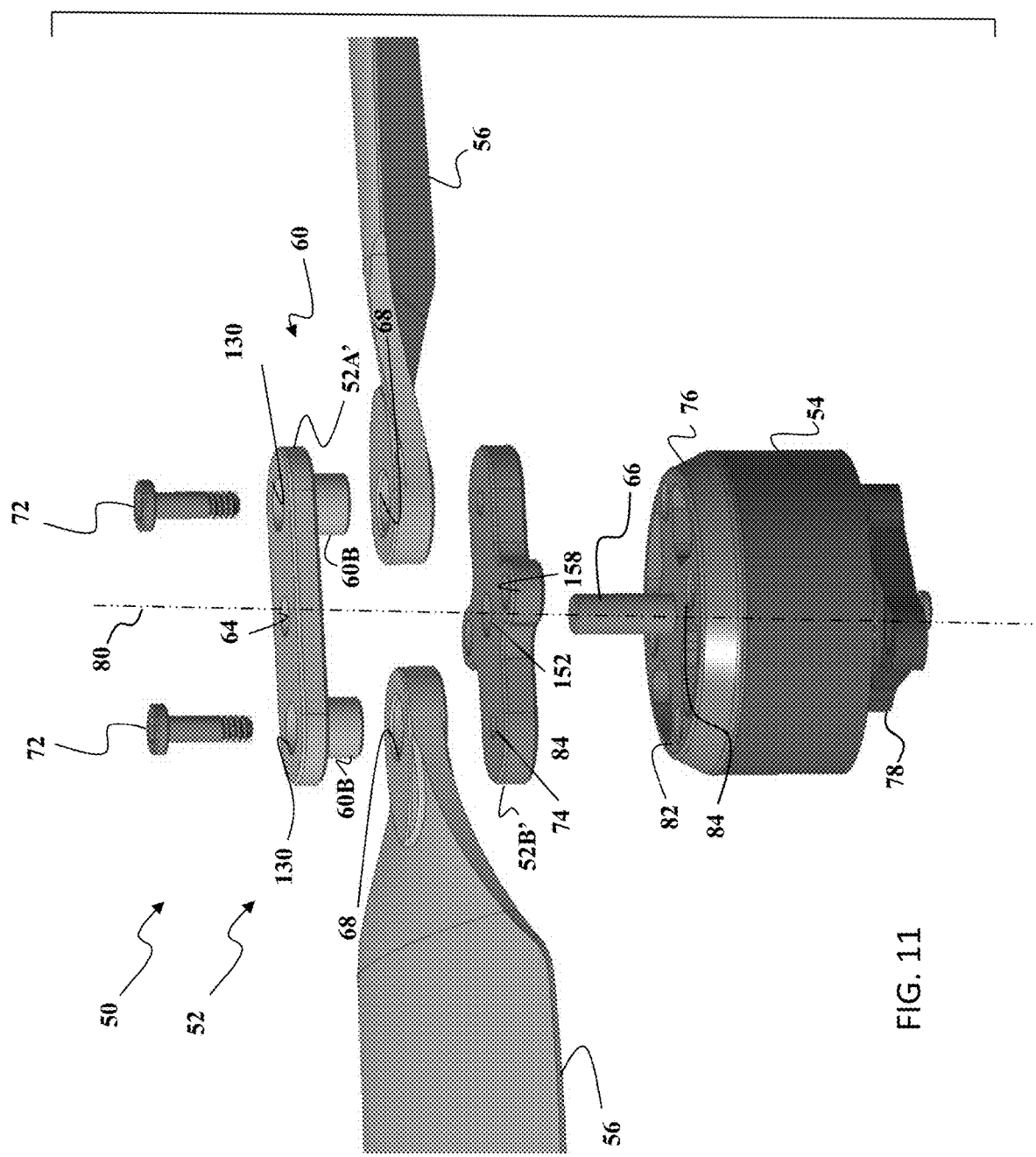

As shown in FIGS. 4, 5, 10 and 11, the rotor blades 56 are in the extended position (away from the rotating motor shaft 66) when the aircraft is in operation. The rotor blades 56 may be rotated or folded in the direction of the arrows marked "A" on the rotor blades 56, as shown (FIGS. 4 and 5).

With reference to FIGS. 4, 5, 10 and 11, in the illustrated embodiment, the motor assembly 54 includes a rotor 76 and a stator 78 operatively coupled to the rotor 76 for rotating the rotor 76 about a rotor centerline axis 80. The rotor 76 includes a blade assembly support member 82 and a motor shaft 66 extending outwardly from the blade assembly support member 82 along the rotor centerline axis 80. The blade assembly support member 82 includes rotating mounting plate that includes a plurality of positioning openings 84 defined along an outer surface of the mounting plate 82. Each positioning opening 84 is spaced radially outwardly from the motor shaft 66 and includes a threaded inner surface that is sized and shaped to receive a corresponding rotor blade assembly fastener 86 therethrough to facilitate coupling the rotor blade assembly 50 to the rotor 76. In one embodiment, the rotating mounting plate 82 may include a plurality of ventilation apertures or vents. The vents provide cooling and reduce weight.

In the illustrated embodiments, the rotor blade assembly 50 is coupled to the rotor 76 to enable the motor assembly 54 to rotate the rotor blade assembly 50 about the rotor centerline axis 80. The rotor blade assembly 50 includes a plurality of plurality of rotor blades 56 that are pivotably coupled to the rotor blade clamping mechanism 52. Each rotor blade 56 includes a rotor blade body 88 (shown in FIG. 9) that includes an airfoil that extends between a root portion 90 and a tip portion 92. The root portion 90 is pivotably coupled to the rotor blade clamping mechanism 52. In the illustrated embodiment, the root portion 90 includes a sidewall 94 that extends between an upper surface 96 and a lower surface 98, and has a thickness 100 measured between the upper surface 96 to the lower surface 98. The root portion 90 also includes a positioning aperture 68 that extends through the rotor blade body 88 from the upper surface 96 to the lower surface 98 along a blade support centerline axis 102. The positioning aperture 68 is sized and shaped to receive the corresponding blade protrusion 60B therethrough to facilitate coupling the rotor blade 56 to the rotor blade clamping mechanism 52.

The rotor blade clamping mechanism 52 includes the upper paddle clamp 52A and the lower paddle clamp 52B. The upper paddle clamp 52A includes an upper support body 104 that extends along a longitudinal axis 106 between a first end 108 and an opposite second end 110. The upper support body 104 includes a sidewall 112 that extends between an upper outer surface 114 and a lower outer surface 116. The upper paddle clamp 52A includes the center protrusion 60A that extends outwardly from the lower outer surface 116 towards the lower paddle clamp 52B. The center protrusion 60A includes an endwall 118 that is spaced a distance from the lower outer surface 116 and a cylindrical outer surface 120 that extends between the endwall 118 and the lower outer surface 116 to define a length 122 of the center protrusion 60A measured from the lower outer surface 116 to the endwall 118. The center protrusion 60A includes an interior surface that defines the center shaft aperture 64 that extends through the center protrusion 60A from the endwall 118 through the upper outer surface 114 of the upper support body 104. The center shaft aperture 64 is sized and shaped to receive the motor shaft 66 therein to facilitate supporting the rotor blade clamping mechanism 52 from the rotor 76.

The upper paddle clamp 52A also includes a plurality of blade support protrusions 60B that extend outwardly from the lower outer surface 116 towards the lower paddle clamp 52B. Each blade support protrusion 60B includes an endwall 124 and a substantially cylindrical outer surface 126 that extends between the endwall 124 and the lower outer surface 116 to define a length 128 of the blade support protrusion 60B measured from the lower outer surface 116 to the endwall 124. The outer surface 126 of the blade support protrusions 60B is sized and shaped to be inserted through the corresponding positioning aperture 68 of a corresponding rotor blade 56 to facilitate pivotably coupling the corresponding rotor blade 56 to the upper paddle clamp 52A. In addition, the blade support protrusion 60B is spaced a distance from the center protrusion 60A along the longitudinal axis 106 such that the rotor blade 56 does not contact the center protrusion 60A with the rotor blade 56 coupled to the rotor blade clamping mechanism 52.

Each blade support protrusion 60B includes an interior surface that defines a blade fastener positioning aperture 130 that extends through the blade support protrusion 60B from the endwall 124 through the upper outer surface 114 of the upper support body 104. The blade fastener positioning aperture 130 is sized and shaped to receive the blade fastener 72 therethrough. In one embodiment, the upper outer surface 114 of the upper support body 104 includes a plurality of fastener recesses 132. Each fastener recess 132 is orientated coaxially with a corresponding blade fastener positioning aperture 130 and is configured to receive a corresponding blade fastener 72 therein such that a top surface of the corresponding blade fastener 72 is substantially flush with the upper outer surface 114.

In the first illustrated embodiment shown in FIGS. 4-8, each blade support protrusion 60B has a length 128 that is greater than a thickness 100 of the root portion 90 of the corresponding rotor blade 56 plus the depth of the recess 70 (see below). In the second illustrated embodiment, shown in FIGS. 10-14, each blade support protrusion 60B has a length 128 that is greater than a thickness 100 of the root portion 90 of the corresponding rotor blade 56. In another embodiment, the length 128 of one or more blade support protrusions 60B is less than, or equal to the thickness 100 of the root portion 90 of the rotor blade 56.

In the illustrated embodiment, the cylindrical outer surface 120 of the center protrusion 60A includes an outer diameter 134 that is larger than an outer diameter 136 of the outer surface 126 of the blade support protrusion 60B. In another embodiment, the diameter 134 of the center protrusion 60A is equal to, or less than, the diameter 136 of the blade support protrusion 60B. In addition, in the illustrated embodiment, the length 122 of the center protrusion 60A is equal to the length 128 of the blade support protrusion 60B. In another embodiment, the length 122 of the center protrusion 60A is greater than, or less than, the length 128 of the blade support protrusion 60B.

The lower paddle clamp 52B includes a lower support body 138 that extends along the longitudinal axis 106 between a first lower body end 140 and a second lower body end 142. The lower support body 138 includes a sidewall 144 that extends between an outer top surface 146 and an outer bottom surface 148. The lower paddle clamp 52B also includes the central recess 62 defined along the outer top surface 146 of the lower support body 138. The central recess 62 includes a substantially cylindrical inner surface that extends from the outer top surface 146 to a bottom wall of the central recess 62 and defines a depth 150 of the central recess 62 measured from the outer top surface 146 to the bottom wall. The inner surface of the central recess 62 is sized and shaped to receive the center protrusion 60A therein, such that the endwall 118 of the center protrusion 60A contacts the bottom wall of the central recess 62. A center aperture 152 is defined within the central recess 62 and extends through the lower support body 138 through to the outer bottom surface 148. The center aperture 152 has an interior surface that is sized and shaped to receive the motor shaft 66 therethrough.

The lower paddle clamp 52B also includes a plurality of blade recesses 70 that are spaced outwardly from the center recess and defined along the outer top surface 146 of the lower support body 138. Each blade recess 70 is positioned with respect to a corresponding blade support protrusion 60B and includes an substantially cylindrical inner surface that extends from the outer top surface 146 to a bottom wall of the blade recess 70 that defines a depth 154 of the blade recess 70 measured from the outer top surface 146 to the bottom wall. The inner surface of the blade recess 70 is sized and shaped to receive a corresponding blade support protrusion 60B therein such that the such that the endwall 124 of the corresponding blade support protrusion 60B contacts a bottom wall of the corresponding blade recess 70. In the illustrated embodiment, the depth 150 of the central recess 62 is equal to the depth 154 of the blade recess 70. In another embodiment, the depth 150 of the central recess 62 is less than, or greater than, the depth 154 of one or more blade recesses 70.

The lower support body 138 also includes a plurality of a blade fastener apertures 74. Each blade fastener aperture 74 is defined through each blade recess 70 and is sized and shaped to receive a corresponding blade fastener 72 therein. Each blade fastener aperture 74 includes a threaded interior surface that is configured to engage a threaded outer surface of the corresponding blade fastener 72 to facilitate coupling the upper paddle clamp 52A to the lower paddle clamp 52B.

In the illustrated embodiment, the lower paddle clamp 52B also includes one or more support flanges 156 that extend outwardly from the lower support body 138. Each support flange 156 includes a fastener opening 158 that extends through the support flange 156 and is sized and shaped to receive a corresponding rotor blade assembly fastener 86 therethrough to facilitate coupling the rotor blade assembly 50 to the rotor 76. In one embodiment, the lower paddle clamp 52B includes a pair of opposing support flanges 156 extending outwardly from the lower support body 138 in opposite directions. As show in FIG. 14, in one embodiment, the pair of opposing support flanges 156 extending outwardly from the lower support body 138 along a transverse axis 160 that is perpendicular to the longitudinal axis 106 of the lower support body 138.

In the illustrated embodiment, the rotor blade assembly 50 may be assembled by inserting each blade support protrusion 60B through a positioning aperture 68 of a corresponding rotor blade, then mounting the upper paddle clamp 52A and rotor blades 56 to the lower paddle clamp 52B such that each blade support protrusion 60B is positioned within a corresponding blade recess 70 of the lower paddle clamp 52B, and such that the center protrusion 60A is positioned within the central recess 62. The blade fasteners 72 are then inserted through each corresponding blade fastener positioning aperture 130 to engage the threaded interior surface of the corresponding blade fastener aperture 74.

Figure 12:
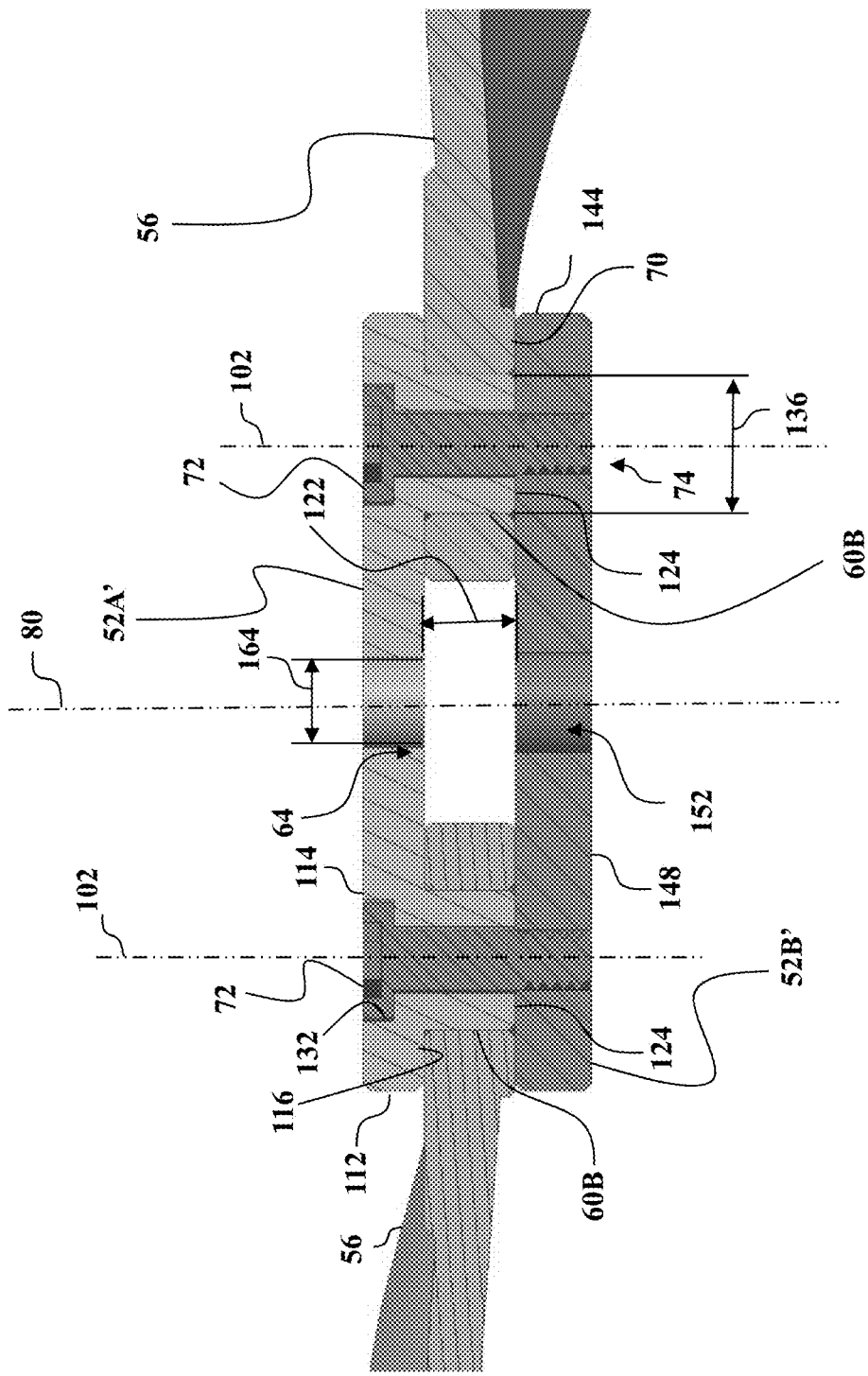
Figure 13:
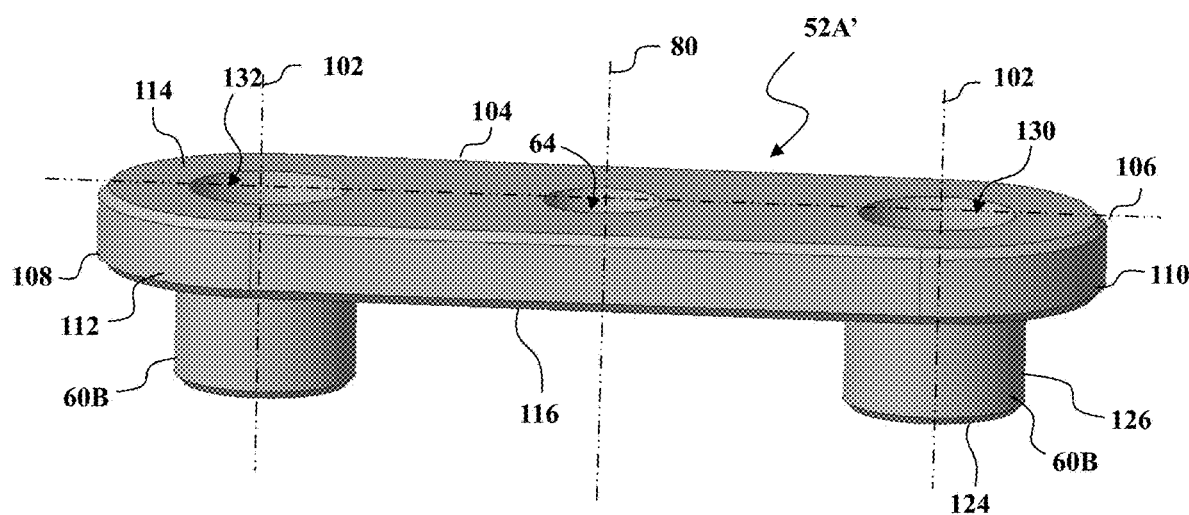
Figure 14:
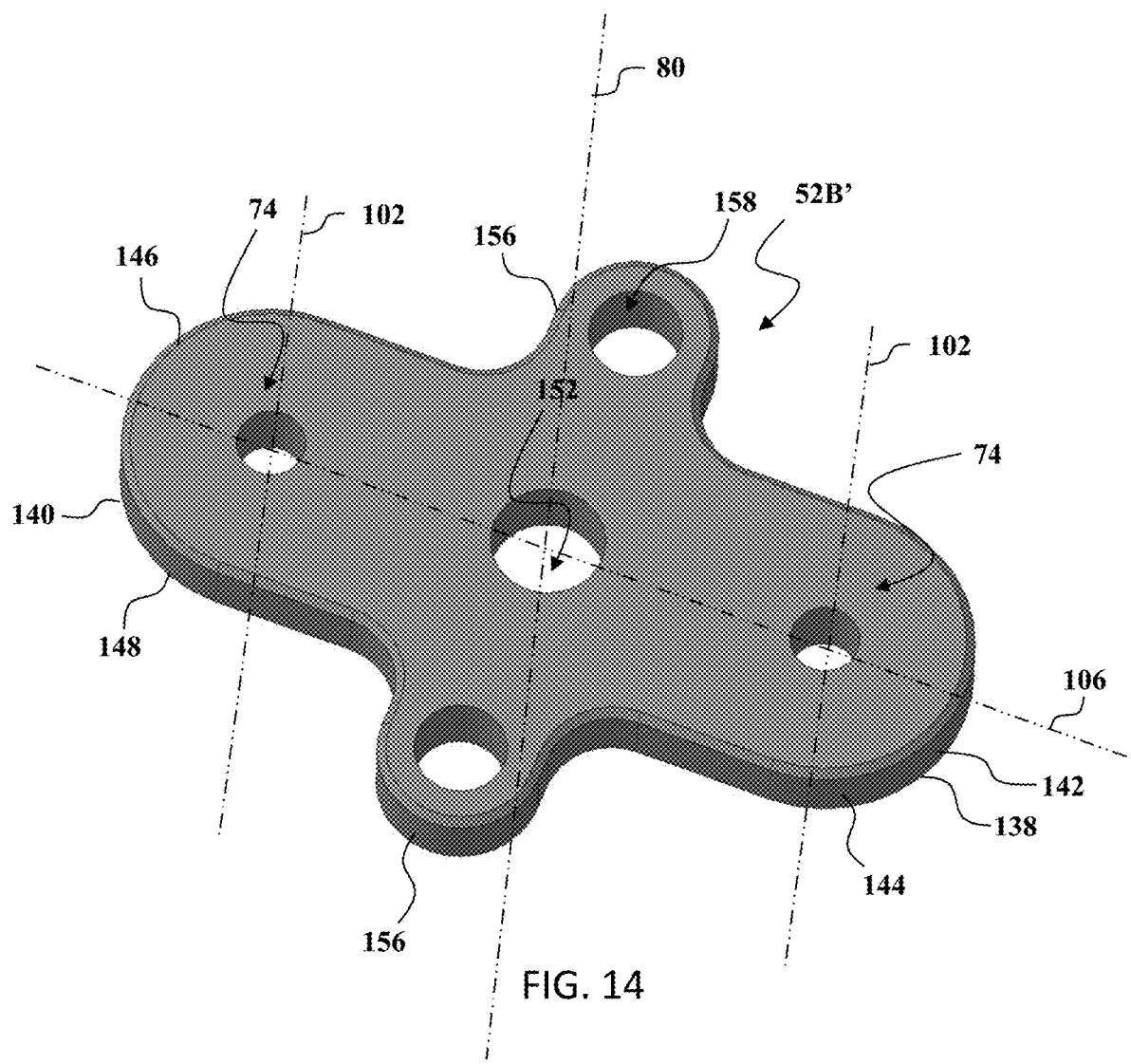

The rotor blade assembly 50 is then mounted to the motor assembly 54 by inserting the motor shaft 66 through the center aperture 152 of the lower paddle clamp 52B and though the center shaft aperture 64 of the upper paddle clamp 52A. In one embodiment, as shown in FIG. 12, the center aperture 152 includes a diameter 162 that is larger than a diameter 164 of the center shaft aperture 64 to facilitate mounting the rotor blade assembly 50 onto the motor assembly 54 by guiding the motor shaft 66 first through the center aperture 152 and then though the center shaft aperture 64. In other embodiments, the diameter 162 of the center aperture 152 is equal to, or less than, the diameter of the center shaft aperture 64.

The rotor blade assembly 50 is then fastened to the motor assembly 54 by inserting the rotor blade assembly fasteners 86 through each fastener opening 158 of each support flange 156 and into each corresponding positioning opening 84 of the blade assembly support member 82 such that the threaded portion of each rotor blade assembly fastener 86 engages with the threaded inner surface of the corresponding positioning opening 84

As each blade fastener 72 may be rotated in a first rotational direction, the blade fastener 72 contacts the upper paddle clamp 52A to bias the upper paddle clamp 52A towards the lower paddle clamp 52B and secure the rotor blade 56 in a desired alignment via a friction fit between the outer surface of the root portion 90 and the upper and lower paddle clamps 52A, 52B. Rotation of the blade fastener 72 in an opposite direction reduces the clamping force imparted onto the rotor blade 56 by the upper and lower paddle clamps 52A, 52B and allows the rotor blade 56 to pivot with respect to the rotor blade clamping mechanism 52 and enable the rotor blades 56 to be moved to a folded stowed position.

In one embodiment, one or more threaded rotor blade assembly fasteners 86 may be inserted through fastener openings 158 and received by the threaded apertures 84 in the rotating mounting plate 82 to fixedly couple the rotor blade assembly 50 to the motor assembly 54. The rotating motor shaft 66 passes through a center hole of the upper paddle clamp 52A to achieve coaxial positioning.

The design has reasonable positioning structure and assembly method to ensure the positioning accuracy, make assembly easier, simplify the parts, and reduce costs.

Accordingly, the embodiments described provide a convenient and robust aerial system for recording images and videos of the user or of the user's environment in a substantially autonomous and self-stabilizing manner. After the aerial system is activated, the aerial system may hover in place without further interaction from the user. While hovering, the aerial system may continuously or periodically obtain images and videos of the user or the user's environment. Thus, the user may easily take pictures of objects of interest without being limited to holding a traditional camera at arm's length, for example.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:
1. An unmanned aerial vehicle, comprising:
a fuselage body; and
a lift mechanism coupled to the fuselage body, the lift mechanism including:
  a motor assembly including a rotor and a stator operatively coupled to the rotor for rotating the rotor about a rotor centerline axis, the rotor including a blade assembly support member and a motor shaft extending outwardly from the blade assembly support member along the rotor centerline axis; and
  a rotor blade assembly coupled to the rotor, the rotor blade assembly including:
    a plurality of rotor blades, each rotor blade extending between a root portion and a tip portion, the root portion including a positioning aperture extending through the root portion; and
    a rotor blade clamping mechanism including:
      an upper paddle clamp including:
        an upper support body including an upper outer surface and a lower outer surface; and,
        a plurality of blade support protrusions extending outwardly from the lower outer surface, each of the blade support protrusions configured to be inserted through a corresponding positioning aperture of a corresponding rotor blade to facilitate pivotably coupling the corresponding rotor blade to the upper paddle clamp, each blade support protrusion having a length that is greater than a thickness of the root portion of the corresponding rotor blade, wherein each blade support protrusion includes a blade fastener positioning aperture configured to receive a blade fastener; and
      a lower paddle clamp including:
        a lower support body; and
        a plurality of apertures defined along an outer surface of the lower support body, each aperture in the outer surface of the lower support body being aligned with a respective blade fastener positioning aperture for receiving the respective blade fastener, the upper and lower support bodies forming a gap configured to receive the root portion of a respective rotor blade, the gap having a predefined distance, the upper and lower paddle clamps forming a center shaft aperture configured to receive the motor shaft therethrough, wherein the root portion of each rotor blade is in contact with the upper paddle clamp and the lower paddle clamp.

2. The unmanned aerial vehicle of claim 1, wherein the predefined distance associated with the gap is greater than the thickness of the root portion of the corresponding rotor blade.

3. The unmanned aerial vehicle of claim 1, wherein the lower paddle clamp includes a plurality of blade recesses defined along the outer surface of the lower support body, each blade recess configured to receive a corresponding blade support protrusion therein.

4. The unmanned aerial vehicle of claim 3, wherein the upper paddle clamp includes a center protrusion extending outwardly from the lower outer surface, the center protrusion including a upper center shaft aperture extending therethrough, the lower paddle clamp includes a central recess defined along an outer surface of the lower support body, the central recess configured to receive the center protrusion therein, wherein the lower paddle clamp further includes a lower center shaft aperture extending through the lower support body and defined within the central recess, the upper center shaft aperture and the lower center shaft aperture forming the center shaft aperture.

5. The unmanned aerial vehicle of claim 4, wherein the center protrusion and each blade support protrusion have the same length.

6. The unmanned aerial vehicle of claim 4, wherein the center protrusion has a larger diameter than each of the blade support protrusions.

7. The unmanned aerial vehicle of claim 4, wherein the central recess and each blade recess have the same depth.

8. The unmanned aerial vehicle of claim 3, wherein the lower support body includes a blade fastener aperture defined through each blade recess and configured to receive a corresponding blade fastener therein, each blade fastener aperture including a threaded interior surface configured to engage a threaded outer surface of the corresponding blade fastener to facilitate coupling the upper paddle clamp to the lower paddle clamp.

9. The unmanned aerial vehicle of claim 1, wherein the lower paddle clamp includes a pair of opposing support flanges extending outwardly from the lower support body in opposite directions.

10. The unmanned aerial vehicle of claim 1, wherein the blade assembly support member includes a plurality of positioning openings, each positioning opening includes a threaded inner surface configured to receive a corresponding rotor blade assembly fastener therethrough to facilitate coupling the rotor blade assembly to the rotor.

11. The unmanned aerial vehicle of claim 1, wherein each blade fastener positioning aperture extends through the upper outer surface of the upper support body.

12. The unmanned aerial vehicle of claim 11, wherein the upper outer surface includes a plurality of fastener recesses, each fastener recess is orientated coaxially with a corresponding blade fastener positioning aperture and is configured to receive a corresponding blade fastener therein such that a top surface of the corresponding blade fastener is substantially flush with the upper outer surface.

13. A rotor blade assembly for use with unmanned aerial vehicle including a fuselage body and a lift mechanism coupled to the fuselage body, the lift mechanism including a motor assembly including a motor shaft, the rotor blade assembly including:
a plurality of rotor blades, each rotor blade extending between a root portion and a tip portion, the root portion including a positioning aperture extending through the root portion; and
a rotor blade clamping mechanism including:
an upper paddle clamp including:
an upper support body including an upper outer surface and a lower outer surface; and,
a plurality of blade support protrusions extending outwardly from the lower outer surface, each of the blade support protrusions configured to be inserted through a corresponding positioning aperture of a corresponding rotor blade to facilitate pivotably coupling the corresponding rotor blade to the upper paddle clamp, each blade support protrusion having a length that is greater than a thickness of the root portion of the corresponding rotor blade, wherein each blade support protrusion includes a blade fastener positioning aperture configured to receive a blade fastener; and
a lower paddle clamp including:
a plurality of apertures defined along an outer surface of the lower support body, each aperture in the outer surface of the lower support body being aligned with a respective blade fastener positioning aperture for receiving the respective blade fastener, the upper and lower support bodies forming a gap configured to receive the root portion of a respective rotor blade, the gap having a predefined distance, the upper and lower paddle clamps forming a center shaft aperture configured to receive the motor shaft therethrough,
wherein the root portion of each rotor blade is in contact with the upper paddle clamp and the lower paddle clamp.

14. The rotor blade assembly of claim 13, wherein the predefined distance associated with the gap is greater than the thickness of the root portion of the corresponding rotor blade.

15. The rotor blade assembly of claim 13, wherein the lower paddle clamp includes a plurality of blade recesses defined along the outer surface of the lower support body, each blade recess configured to receive a corresponding blade support protrusion therein.

16. The rotor blade assembly of claim 15, wherein the upper paddle clamp includes a center protrusion extending outwardly from the lower outer surface, the center protrusion including a upper center shaft aperture extending therethrough, the lower paddle clamp includes a central recess defined along an outer surface of the lower support body, the central recess configured to receive the center protrusion therein, wherein the lower paddle clamp further includes a lower center shaft aperture extending through the lower support body and defined within the central recess, the upper center shaft aperture and the lower center shaft aperture forming the center shaft aperture.

17. The rotor blade assembly of claim 16, wherein the center protrusion and each blade support protrusion have the same length.

18. The rotor blade assembly of claim 16, wherein the center protrusion has a larger diameter than each of the blade support protrusions.

19. The rotor blade assembly of claim 16, wherein the central recess and each blade recess have the same depth.

20. The rotor blade assembly of claim 15, wherein the lower support body includes a blade fastener aperture defined through each blade recess and configured to receive a corresponding blade fastener therein, each blade fastener aperture including a threaded interior surface configured to engage a threaded outer surface of the corresponding blade fastener to facilitate coupling the upper paddle clamp to the lower paddle clamp.

21. The rotor blade assembly of claim 13, wherein the lower paddle clamp includes a pair of opposing support flanges extending outwardly from the lower support body in opposite directions.

22. The rotor blade assembly of claim 13, wherein the blade assembly support member includes a plurality of positioning openings, each positioning opening includes a threaded inner surface configured to receive a corresponding rotor blade assembly fastener therethrough to facilitate coupling the rotor blade assembly to the rotor.

23. The rotor blade assembly of claim 13, wherein each blade fastener positioning aperture extends through the upper outer surface of the upper support body.

24. The rotor blade assembly of claim 23, wherein the upper outer surface includes a plurality of fastener recesses, each fastener recess is orientated coaxially with a corresponding blade fastener positioning aperture and is configured to receive a corresponding blade fastener therein such that a top surface of the corresponding blade fastener is substantially flush with the upper outer surface.

* * * * *